March 23, 1965 J. PICKLES 3,174,715
FOUR-WAY SEAT
Filed Jan. 7, 1963 4 Sheets-Sheet 1
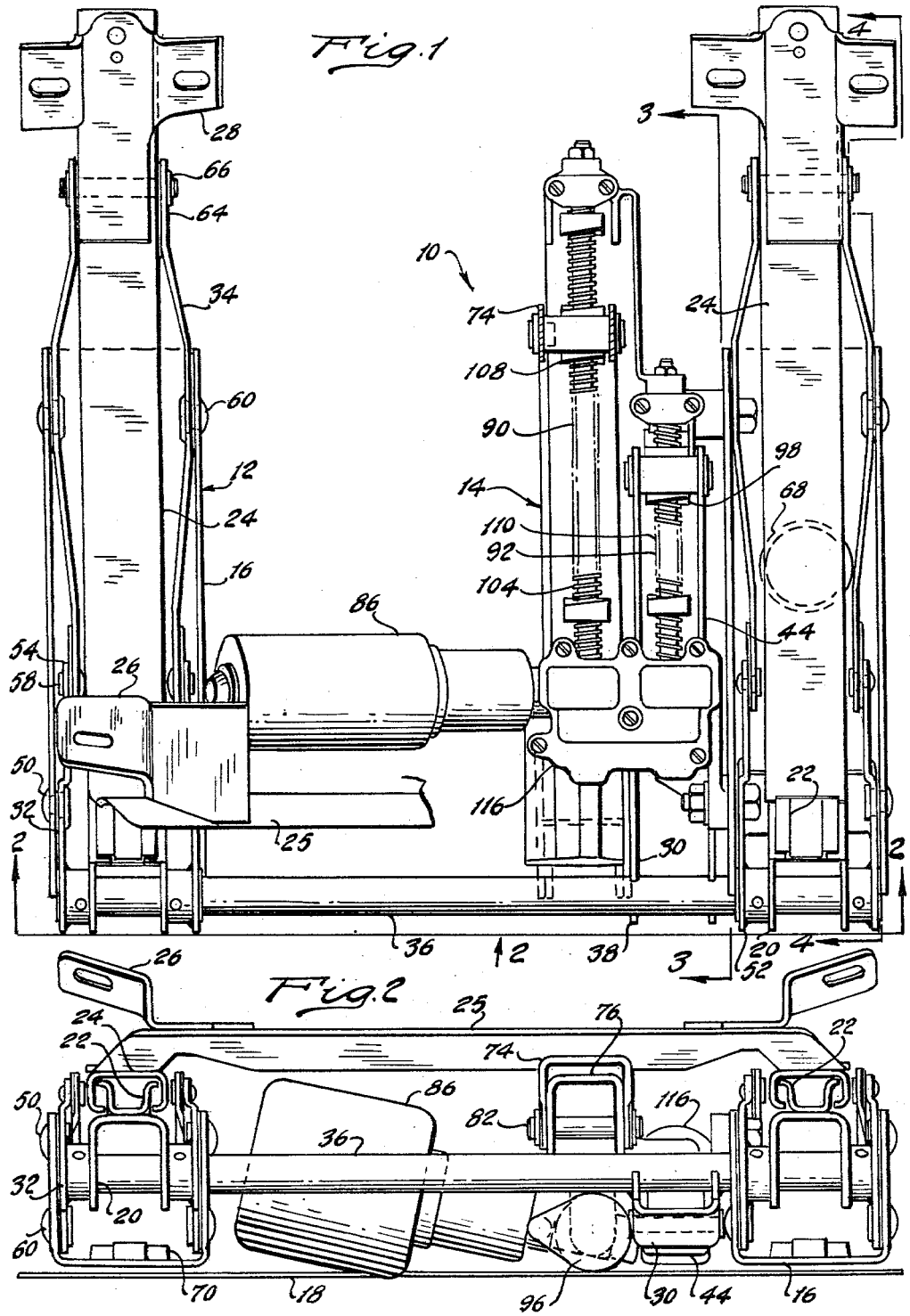

March 23, 1965
J. PICKLES
3,174,715
FOUR-WAY SEAT
Filed Jan. 7, 1963
4 Sheets-Sheet 2
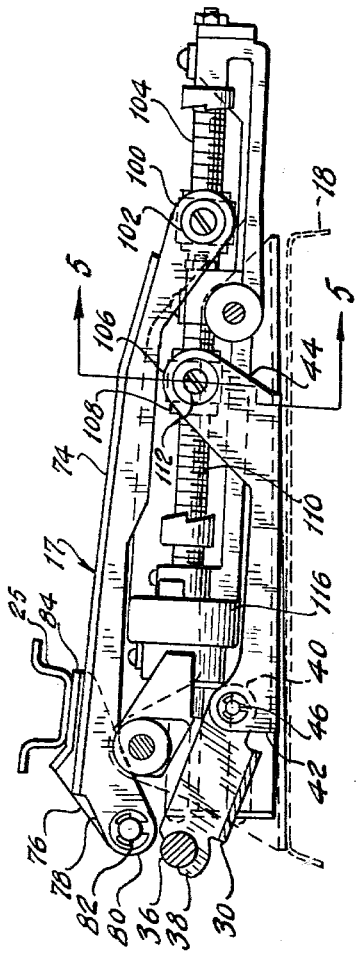
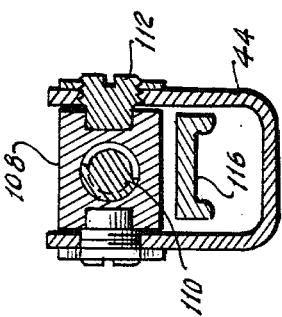
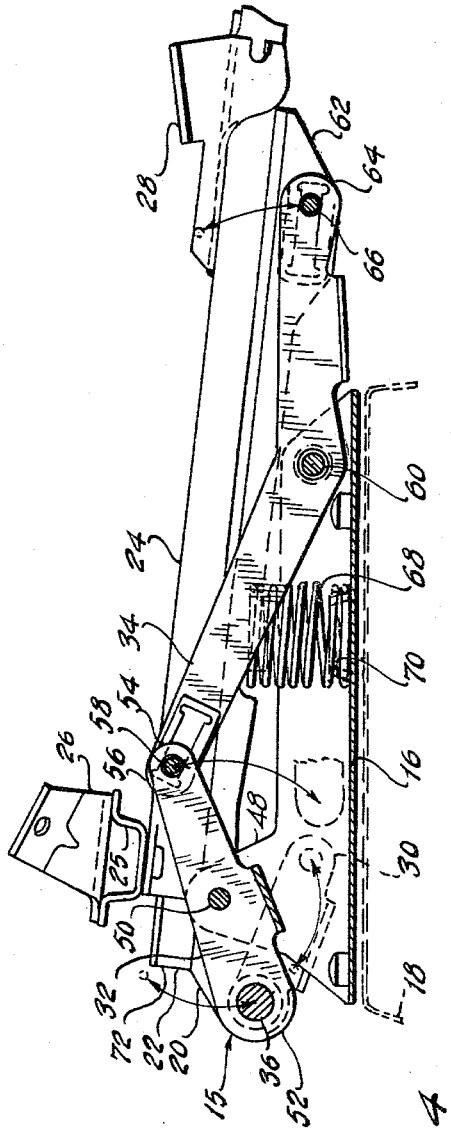
INVENTOR.
JOSEPH PICKLES
BY Whittemore,
Hulbert & Belknap
ATTORNEYS.

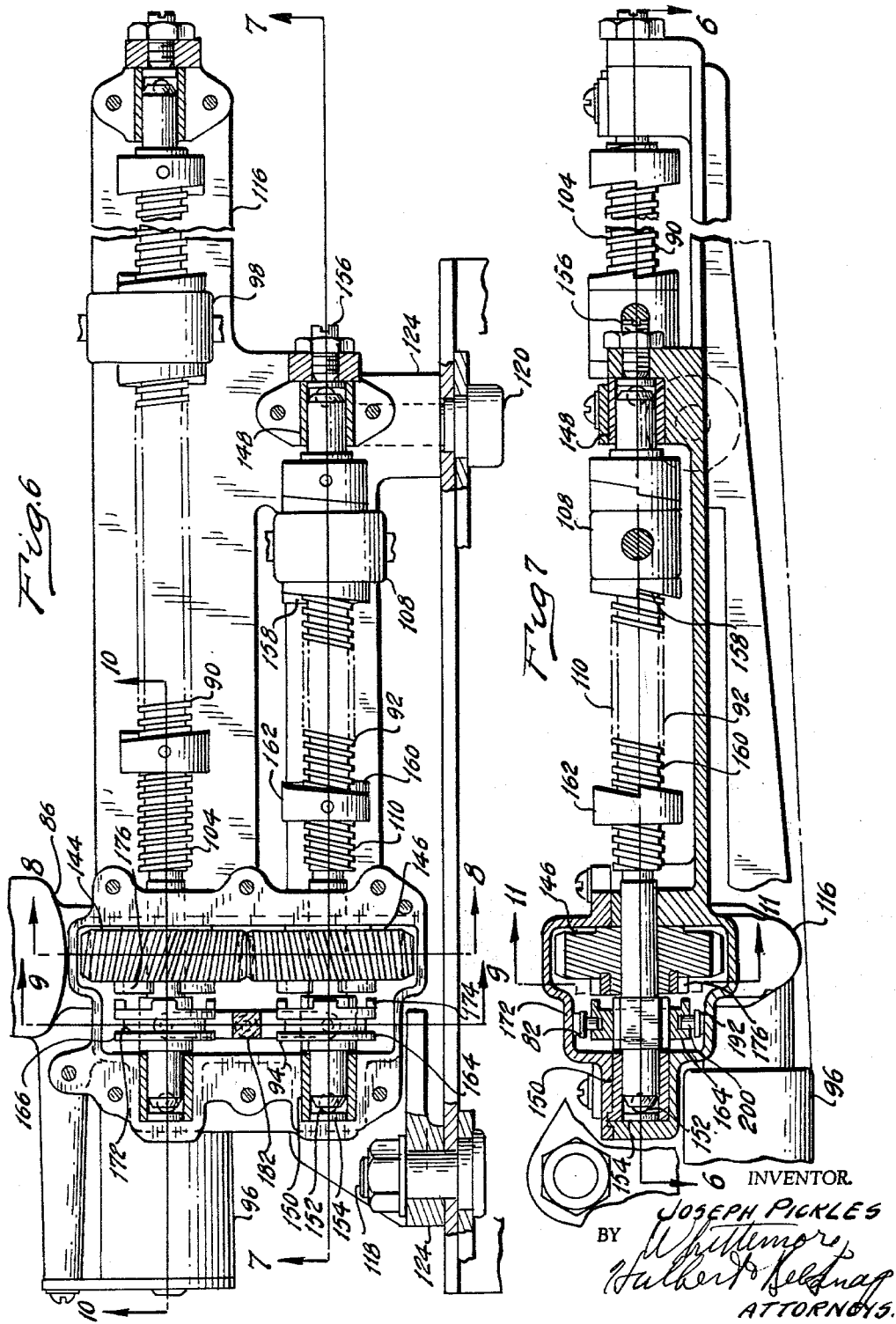

March 23, 1965  J. PICKLES  3,174,715
FOUR-WAY SEAT
Filed Jan. 7, 1963  4 Sheets-Sheet 4
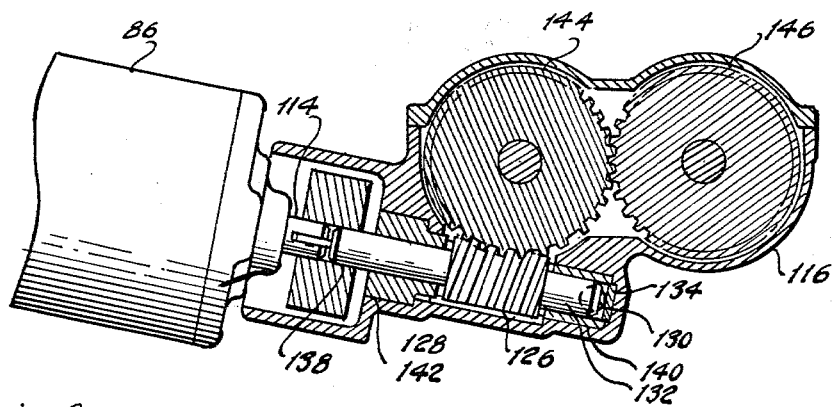
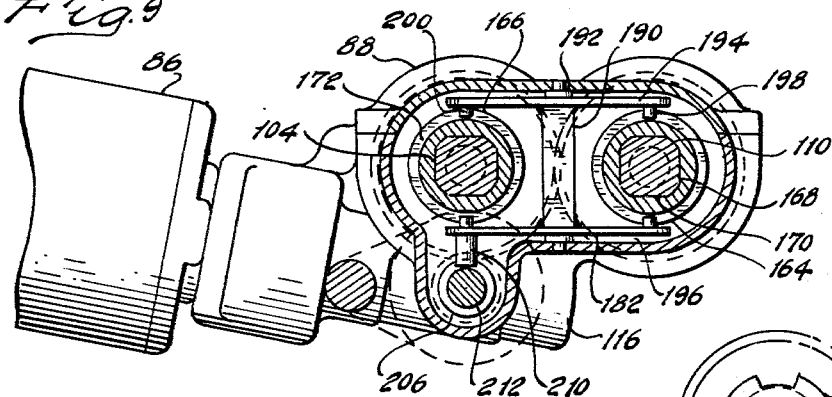
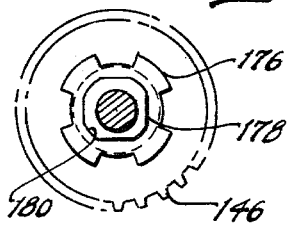
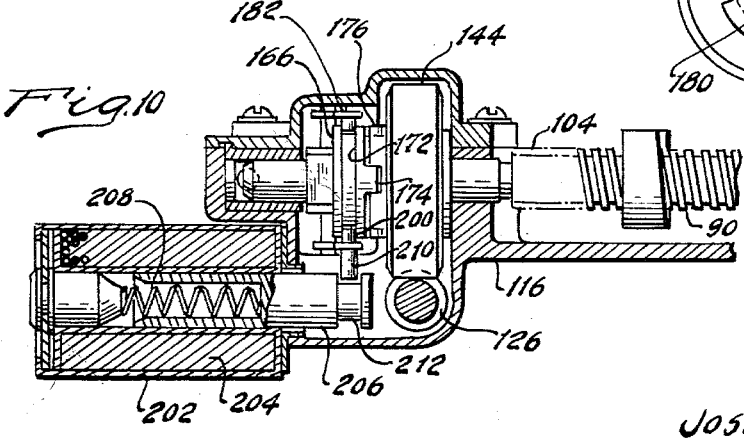
INVENTOR.
JOSEPH PICKLES
BY Whittemore,
Hulbert & Belknap
ATTORNEYS ns and Patent Office 3,174,715
Patented Mar. 23, 1965

3,174,715
FOUR-WAY SEAT
Joseph Pickles, Dearborn, Mich., assignor to Ferro Stamping Company, Detroit, Mich., a corporation of Michigan
Filed Jan. 7, 1963, Ser. No. 249,688
6 Claims. (Cl. 248—419)

The invention relates to seat adjusting apparatus and refers more specifically to four-way seat adjusting apparatus including simplified mechanical seat positioning structure and an improved drive assembly therefor.

In the past four-way seat adjusting apparatus has been characterized by relatively complicated mechanical seat positioning structures and inefficient, often duplicated, drive assemblies therefor. Thus, for example, in the past seat adjusting apparatus has sometimes taken the form of separate extensible screws and separate drive means therefor positioned at the front and rear of individual seats at both sides thereof for moving the seats up and down and separate extensible links and drive means for moving the seats forward and backward. Where a single motor has been used in the past to drive a mechanical seat positioning structure the seat positioning structure has generally been clutched to the motor on the low torque side of the usual reduction gearing provided between the motor and seat positioning structure.

It is therefore one of the objects of the present invention to provide seat adjusting apparatus including simplified mechanical seat positioning structure and an improved drive assembly therefor.

Another object is to provide improved seat adjusting apparatus as set forth above wherein the drive assembly includes a single motor and means for clutching the single motor to the mechanical seat positioning structure on the high torque side of reduction gearing between the motor and mechanical seat positioning structure.

Another object is to provide structure as set forth above wherein the means for clutching the motor to the mechanical seat positioning structure comprises a pair of nut and screw structures for imparting desired movement to the mechanical seat positioning structure, a gear rotatably mounted on the screw of each nut and screw structure in mesh with each other and having clutch means on one side thereof, a pair of clutch collars mounted on said screws for rotation therewith and axial movement with respect thereto, means for selectively and alternatively engaging the clutch collars with the clutch means on the gears and means for driving one of said gears from the motor.

Another object is to provide mechanical seat positioning structure comprising a torsion bar extending transversely between opposite sides of the seat, a track positioned at each side of said seat pivoted at one end to the torsion bar, a first lever rigidly secured to said torsion bar centrally thereof adjacent one end of the tracks, a second lever at each side of said seat pivoted centrally to a fixed support and rigidly secured at one end to the torsion bar, a third lever at each side of said seat pivotally secured centrally thereof to the respective support adjacent the other end of the tracks and secured to said other end of said track at one end thereof and to the other end of the second lever at the other end by sliding pivotal connections, means secured to the other end of said first lever for pivoting both the second and third levers about their pivotal axis to raise or lower the tracks and a seat positioned on slides carried by said tracks.

Another object is to provide mechanical seat positioning structure as set forth above and further including a fourth and fifth lever pivotally secured together at one end one of which is secured to the slides at the other end thereof and the other of which is movable longitudinally for producing forward and backward movement of said slides and a seat positioned thereon.

Another object is to provide a drive assembly for seat adjusting apparatus or the like comprising a single motor, reduction gearing, clutch structure and a screw and nut structure connected in series.

Another object is to provide a drive assembly for seat adjusting apparatus or the like as set forth above wherein a portion of the reduction gearing is rotatably mounted on the screw of the nut and screw structure, the clutch structure is mounted on the screw for movement axially thereof and for rotation therewith and means are provided for selectively coupling the clutch structure with the reduction gearing.

Another object is to provide seat adjusting apparatus which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a plan view of seat adjusting apparatus constructed in accordance with the invention.

FIGURE 2 is a front elevation of the seat adjusting apparatus illustrated in FIGURE 1 taken in the direction of arrow 2 in FIGURE 1.

FIGURE 3 is a section view of the seat adjusting apparatus illustrated in FIGURE 1 taken substantially on the line 3—3 in FIGURE 1.

FIGURE 4 is a section view of the seat adjusting apparatus shown in FIGURE 1 taken substantially on the line 4—4 in FIGURE 1.

FIGURE 5 is a partial section view of the seat adjusting apparatus illustrated in FIGURE 1 taken substantially on the line 5—5 in FIGURE 3.

FIGURE 6 is a partial plan view of the seat adjusting apparatus illustrated in FIGURE 1 with the clutch and reduction gearing housing cover removed therefrom.

FIGURE 7 is a partial section view of the seat adjusting apparatus illustrated in FIGURE 1 taken substantially on the line 7—7 in FIGURE 6.

FIGURE 8 is a partial section view of the seat adjusting apparatus illustrated in FIGURE 1 taken substantially on the line 8—8 in FIGURE 6.

FIGURE 9 is a partial section view of the seat adjusting apparatus illustrated in FIGURE 1 taken substantially on the line 9—9 in FIGURE 6.

FIGURE 10 is a partial section view of the seat adjusting apparatus illustrated in FIGURE 1 taken substantially on the line 10—10 in FIGURE 6.

FIGURE 11 is a partial section view of the seat adjusting apparatus illustrated in FIGURE 1 taken substantially on the line 11—11 in FIGURE 7.

With particular reference to the drawings one embodiment of the present invention will now be considered in detail.

The seat adjusting apparatus 10 illustrated in FIGURE 1 includes the mechanical seat positioning structure 12 and the drive assembly 14 for actuating the mechanical seat positioning structure 12. The seat adjusting apparatus 10 illustrated in FIGURE 1 is a four-way seat adjusting apparatus in that it is capable of producing movement of a seat secured thereto in an up and down direction and in a forward and backward direction. As shown the seat adjusting apparatus 10 is adapted to be used with individual seats, such as the currently popular bucket type seats.

More specifically the mechanical seat positioning structure 12 of the seat adjusting apparatus 10 includes the structure 15 for moving a seat secured thereto in an up and down direction and structure 17 for moving a seat secured thereto in a forward and backward direction. The structures 15 and 17 of the mechanical seat positioning structure 12 for moving the seat up and down and in a forward and backward direction are coupled to the drive assembly 14 separately for separate alternative actuation thereby.

The structure 15 for moving a seat in an up and down direction includes at each side of the seat a channel-shaped supporting member 16 secured to the vehicle floor panel 18 or similar fixed abutment by convenient means (not shown), the inverted channel-shaped track support 20, track 22 rigidly secured to the track support 20 and slide 24 mounted on track 22 for relative movement longitudinally thereof having seat support channel 25 and brackets 26 and 28 secured thereto. The mechanical linkage including levers 30, 32 and 34 and the torsion bar 36 is also part of the mechanical seat positioning structure 12. Levers 32 and 34 are provided on both sides of the seat.

As shown best in FIGURE 3 the lever 30 which is also channel-shaped is rigidly secured to the torsion bar 36 at end 38 by convenient means, such as welding. Lever 30 is pivotally secured at end 40 to the end 42 of the force transfer member 44 by pivot means 46.

Lever 32 is pivotally secured centrally to the end 48 of the supporting member 16 by pivot means 50, as shown best in FIGURE 4. Lever 32 is further rigidly connected at end 52 to the torsion bar 36 and at the end 54 to the end 56 of lever 34 by means of the sliding pivotal connection 58. Lever 34 is similarly pivotally connected centrally thereof to the supporting member 16 by pivot means 60 and to the end 62 of track support 20 at end 64 by the sliding pivotal connection 66. Each of levers 32 and 34 are also channel-shaped in that they have two sides and a connecting lower portion, as shown best in FIGURES 1 and 4.

A coil spring 68 is provided between the supporting member 16 and the track support 20, as shown best in FIGURE 4, and is held in place between guides 70 formed in the supporting member 16. The spring 68 serves to counterbalance a portion of the load which may be placed on the mechanical seat positioning structure to reduce the required actuating force therefor.

In operation of the structure 15 for moving the mechanical seat positioning structure 12 to produce upward movement of a seat secured thereto for example, the force transfer member 44 is moved toward the torsion bar 36 by the drive assembly 14 in a manner to be considered subsequently. The lever 30 rigidly secured to the torsion bar 36 is therefore caused to move the torsion bar 36 and the lever 32 also rigidly secured to the torsion bar 36 about the pivotal mounting 50 of the lever 32. As a result of such movement of the lever 32, the end 72 of the track support 20 which is pivotally mounted on the torsion bar 36 is moved in an up direction.

At the same time the end 54 of the lever 32 and the end 56 of lever 34 which is pivotally connected thereto by the sliding pivot connections 58 are moved downward. Downward movement of the end 56 of lever 34, as shown in FIGURE 4, will produce counterclockwise movement of lever 34 about pivot means 60. End 64 of lever 34 and consequently end 62 of the track support 20 are also moved upward.

Thus it will be seen that on movement of the force transfer member 44 toward the torsion bar 36 that both ends of the track support 20 and thus the track 22 are moved in an up direction to move a seat secured to the brackets 26 and 28 fastened to slides 24 in an up direction. Similarly movement of the force transfer member 44 in a direction away from the torsion bar 36 will produce a downward movement of a seat secured to slides 24 by the brackets 26 and 28.

The structure 17 for moving the seat forward and backward includes force transfer member 74 and linkage 76 pivotally connected at end 80 to end 78 of force transfer member 74 by the pivot means 82 and connected to the seat supporting channel 25 at end 84. As shown, both the force transfer member 74 and linkage 78 are channel-shaped members.

In operation on movement of the force transfer member 74 substantially axially in a forward direction by the drive assembly 14 in a manner to be considered subsequently the channel 25 and therefore the slides 24 and a seat carried by the brackets 26 and 28 will be moved forward therewith. During height adjustment of a seat secured to the brackets 26 and 28 by the structure 15 the relative angular position of the force transfer member 74 and linkage 76 will be adjusted about pivot means 82 to accommodate the height adjustment. Similarly axial movement of the force transfer member 74 in a leftward direction, as illustrated in FIGURE 3, will produce similar leftward or backward movement of slides 24 on tracks 22 and consequent similar movement of a seat secured to the brackets 26 and 28.

The drive assembly 14 includes the drive motor 86, reduction gearing 88, separate screw and nut structures 90 and 92, clutch means 94, and clutch actuating mechanism 96, as shown best in FIGURES 6 and 7.

The nut 98 of screw and nut structure 90 is connected to the force transfer member 74 at end 100 thereof by pivot means 102 whereby axial movement of the force transfer member 74 is produced on movement of the nut 98 along the screw 104 of the screw and nut structure 90. The force transfer member 44 is secured at end 106 to nut 108 which is movable axially of screw 110 of nut and screw structure 92 by pivot means 112, best shown in FIGURE 5.

The drive motor means 86 is a single ended electrically operated reversible motor. Motor 86 is connected to the reduction gearing 88 through drive shaft 114, as shown best in FIGURE 8. Reduction gearing 88 is mounted in housing 116 which in turn is supported from supporting member 16 by bolts 118 and 120 in conjunction with housing bosses 122 and 124, respectively.

Reduction gearing 88 includes the worm gear 126 secured to shaft 128 for rotation therewith. Shaft 128 is provided with a ball bearing 130 in end 132 thereof which is engaged with a bearing plate 134 carried by housing 116 and is connected to the drive shaft 114 at end 136 whereby shaft 128 is rotated in bearings 140 and 142 in opposite directions on rotation of drive shaft 114 of motor 86 in opposite directions.

Reduction gearing 88 further includes the worm gear 144 journaled on screw 104 of screw structure 90 for rotation with respect thereto and the gear 146 in mesh with the gear 144 which is journaled on the screw 110 of the nut and screw structure 92 for rotation with respect thereto. Thus on rotation of the worm 126 the worm gear 144 and gear 146 are rotated in accordance with the direction of rotation of the worm 126.

The nut and screw structure 94, as shown best in FIGURE 6, includes the elongated screw 110 supported by housing 116 at opposite ends thereof in bearings 148 and 150, respectively. The screw 110 is provided with bearings 152 in the opposite ends thereof engaged with bearing plates 154 secured in housing 116. An adjusting screw 156 is provided for adjusting the axial force on the screw 110.

Nut 108, as shown in FIGURE 5, is threaded on screw 110 for movement axially thereof on rotation of the axially stationary screw. Nut 108 includes the abutment surfaces 158 on opposite ends thereof engageable with similar abutment surfaces 160 on stops 162 secured in fixed positions on screw 110 to limit axial travel of the nut 108 on screw 110. Thus on rotation of screw 110 it will be obvious that nut 108 will be moved longitudinally thereof to move the force transfer member 44 toward or away from the torsion bar 36 whereby up and down movement of a seat secured to brackets 26 and 28 is accomplished.

The nut and screw structure 90 illustrated in FIGURE 6 is similar to nut and screw structure 92 and will therefore not be considered in detail. It will however be pointed out that on axial movement of the nut 98 the force transfer member 44 is caused to move axially to move a seat secured to channel 25 by slides 24 and brackets 26 and 28 forward and backward in accordance with the invention. The screw 104 is longer than screw 110 whereby the seat adjustment may be of greater magnitude in the forward and backward direction than in the up and down direction.

Clutch means 94, as best shown in FIGURES 6, 7, 9 and 10 includes a separate clutch collar 164 and 166 sleeved over the screws 104 and 110, respectively. Each of the collars 166 and 164 is provided with a non-circular inner periphery 168, as shown in FIGURE 9, which permits axial movement of the collars 164 and 166 on the correspondingly non-circular portion 170 of the screws 104 and 110 without permitting relative rotation therebetween. The collars 166 and 164 are further provided with an exterior annular groove 172 therearound and clutch dogs 174 projecting from angularly spaced positions around the outer circumference of the surface thereof adjacent the gears 144 and 146, as shown best in FIGURES 6 and 10. Clutch means 94 further includes a fitting having clutch dogs 176 formed at the outer circumference thereof which fitting is secured to a non-circular hub 178 on the gears 144 and 146 by means of a similarly non-circular inner periphery 180.

Thus on movement of collar 164 toward gear 146 the dogs 174 and 176 mesh whereby the gear 146 will be caused to drive the screw 110 through the collar 164. Similarly, when collar 166 is moved toward gear 144 the dogs 174 and 176 mesh and the screw 104 is driven through the collar 166 by gear 144.

The clutch actuating mechanism 96 of the drive assembly 14, as best shown in FIGURES 7, 9 and 10, includes a yoke 182 comprising a sleeve 190 journaled on shaft 192 for rotation with respect thereto and supporting the transversely extending members 194 and 196 having the pins 198 and 200 secured to the opposite ends thereof and inserted within the annular groove in the clutch collars 164 and 166, respectively. Clutch actuating mechanism 96 further includes the solenoid 202 comprising the coil 204 adapted to be energized by convenient electrical means (not shown) and the armature 206 which is urged to the right in FIGURE 10 by spring 208. The solenoid armature 206 is connected to the pin 210 of the yoke 182 by means of the annular groove 212 in the end of the armature 206.

Thus in operation of the drive assembly 14 the armature 206 is generally held in an outermost position with respect to the solenoid 204 by spring 208 whereby the clutch collar 166 is engaged with the worm gear 144 for driving screw 104 when the motor 86 is energized. When the solenoid 202 is energized the armature 206 is moved to the left in FIGURE 10 whereby yoke 182 is rotated about shaft 192 and collar 164 is engaged with drive gear 146 to produce rotation of screw 110 when motor 86 is energized. It will thus be recognized that the rotation of screws 104 and 110 and thus the forward and backward and up and down movement of a seat secured to the brackets 26 and 28 will be alternative.

Further it will be noted that the driving of the screws 104 and 110 by the drive motor 86 is through the reduction gearing 88 first, through clutch collars 166 and 164 to the screws 104 and 110. Thus in the present invention the screws 104 and 110 are clutched to the drive motor 86 on the low torque side of the drive motor whereby less wear of the clutch members will result from extended use of the seat adjusting apparatus 10.

In over-all use of the seat adjusting apparatus 10 of the invention, when it is desired to, for example, raise a seat secured to the brackets 26 and 28, a switch (not shown) which may be located on the dash of an automobile in which the seat is positioned is actuated to energize the electrical motor 86 in a predetermined direction and to simultaneously energize the solenoid 202 whereby the clutch yoke 182 is pivoted to engage the clutch collar 164 and drive gear 146. Screw 110 is then rotated through worm 126, worm gear 144, gear 146 and clutch collar 164. Rotation of the screw 110 will cause axial movement of the nut 108 to produce leftward movement of the force transfer member 44, as shown in FIGURE 3, and consequent upward pivoting of the end 52 of lever 32 and end 64 of lever 34 as previously considered. Upward movement of end 52 of lever 32 and end 64 of lever 34 will cause upward movement of the track 22 and brackets 26 and 28 to which the seat is secured.

When it is then desired to adjust the seat forward a switch which may also be located on the dash is actuated to energize motor 86 without the solenoid 202 being energized whereby clutch collar 166 engages the gear 144 and screw 104 is driven by motor 86 as previously considered. Driving of screw 104 will cause axial movement of nut 98 and force transfer member 74 to the left in FIGURE 3 and consequent movement of the channel 25 and slides 24 carrying the seat in a forward direction.

Obviously downward and backward movement of a seat may be accomplished with the disclosed structure in the manner above indicated by merely connecting the motor 86 through the indicated actuating switches for reverse rotation on opposite movement of the switches as will be apparent to those skilled in the art.

While one embodiment of the present invention has been set forth in detail other embodiments and modifications of the invention are contemplated. It is therefore the intention to include all embodiments and modifications of the invention described by the appended claims within the scope of the invention.

What I claim as my invention is:

1. Seat adjusting apparatus including a track at each side of the seat, a slide mounted on each track, brackets at the rear of each slide for connecting the rear of the seat to the slides, a connecting member extending transversely of the seat between the slides at the front end thereof and brackets secured to said connecting member to which the front of the seat is connected, structure connected to the tracks at each end thereof for moving the tracks at each side of the seat up and down simultaneously on actuation thereof, actuating structure for actuating the structure for moving the tracks up and down connected to the structure for moving the tracks up and down, actuating structure for moving the slides longitudinally of said track connected to said connecting member, a pair of fixedly mounted screw members, a nut member mounted on each of said screw members for movement therealong on rotation of said screw members each of which is connected to a separate one of the actuating structures, a worm gear mounted on each of the screw members for rotation with respect thereto and in mesh with each other, a worm in mesh with one of said worm gears, means for rotatably driving said worm, clutch means secured to each of said screw members for axial movement therealong and rotation therewith, connecting means secured to the worm gears for selective engagement with said clutch means whereby said screw members may be rotated through said worm gears, and means for selectively and alternatively connecting said clutch means and connecting means to rotate the individual screw members to adjust the seat up or down, or backward or forwards.

2. Structure as set forth in claim 1 wherein each of the clutch means comprises a cylindrical member having an annular groove thereabout and the means for selectively and alternatively connecting the clutch means and connecting means comprises a yoke pivotally mounted centrally having pin members secured to the opposite ends thereof extending within the annular groove in corresponding clutch means, a solenoid actuated armature, pin means secured to one end of the yoke and secured to the armature for movement therewith and spring means urging said armature in one direction to bias one of the clutch means into engagement with one of the connecting means.

3. Structure as set forth in claim 1 wherein the actuating means for moving the seat backward and forward comprises a force transfer member pivotally secured at one end to the nut member on one of the screw members and a linkage rigidly secured to the connecting member at one end and pivoted at the other end to the other end of the force transfer member.

4. Structure as set forth in claim 1 wherein the actuating means for the structure for moving the tracks up and down simultaneously comprises a torsion bar extending between the structure for moving the tracks up and down simultaneously at opposite sides of the seat, a force transfer member pivotally secured at one end to a nut member on one of the screw members, a lever rigidly secured at one end to the torsion bar and pivoted at the other end to the other end of the force transfer member.

5. Structure as set forth in claim 4 wherein the structure for moving the tracks at each side of the seat up and down simultaneously comprises a support secured at each side of the seat, a second lever pivotally secured to the support centrally at the front of the seat on each side thereof and rigidly secured to the torsion bar at one end, a third lever pivotally secured centrally thereof to each of the supports adjacent the back of said seat, a sliding pivot connection between one end of the third lever and the back of the track at the respective sides of the seat and a second sliding pivot connection between the other ends of the second and third levers.

6. Seat adjusting apparatus including a track at each side of the seat, a slide mounted on each track, brackets at the rear of each slide for connecting the rear of the seat to the slide, a connecting member extending transversely of the seat between the slides at the front thereof and brackets secured to said connecting member to which the front of the seat is connected, structure for moving the tracks at each side of the seat up and down simultaneously including a support member positioned at each side of the seat, a first lever centrally pivoted to the back end of the support member, a sliding pivot connection connecting one end of the first lever to the rear of the track member, a torsion bar extending between the structure at opposite sides of the seat at the front of the seat, a second lever centrally pivotally secured to the front end of the support member at each side of the seat and rigidly secured at one end to the torsion bar, a sliding pivot connection between the other ends of the first and second levers, a drive assembly for driving the structure for moving the tracks up and down including a fixed screw, a nut secured to said screw for movement axially thereof on rotation of said screw, a force transfer member pivotally secured to said nut at one end, a third lever rigidly secured to said torsion bar at one end and pivotally secured to the other end of said force transfer member at the other end thereof, structure for moving the slides longitudinally of said track comprising a second axially fixed screw and a second nut threaded on said second screw for movement axially thereof on rotation of said screw, a second force transfer member pivotally secured at one end to the second nut, a connecting link rigidly secured to said connecting member at one end and pivotally secured to the other end of said second force transfer member at the other end thereof, and means for selectively and alternatively rotating said screw members comprising a pair of worm gears in mesh with each other and mounted for rotation on the screw members having clutch engaging connecting means secured to one side thereof, a worm driving one of said worm gears, means for driving said worm in opposite directions selectively, clutch members engageable with said connecting means secured to each of said screw members for movement axially thereof and for rotation therewith, yoke means operably associated with said clutch members for movement of said clutch members in opposite directions on said screw members, resilient biasing means urging said yoke means in one direction to engage one of said clutch members with one of said connecting means and a solenoid operated armature for pivoting said yoke means centrally thereof to disengage said one clutch member from said one connecting means and engage the other clutch member with the other connecting means.

References Cited in the file of this patent

UNITED STATES PATENTS

| | | |
|---|---|---|
| 2,809,688 | Brundage | Oct. 15, 1957 |
| 2,837,931 | Brundage | June 10, 1958 |
| 2,907,371 | Scott | Oct. 6, 1959 |
| 2,931,424 | Pickles | Apr. 5, 1960 |